6 Sheets—Sheet 2.
A. O. DAVID.
Manufacture of Weldless Chains.
No. 224,659. Patented Feb. 17, 1880.
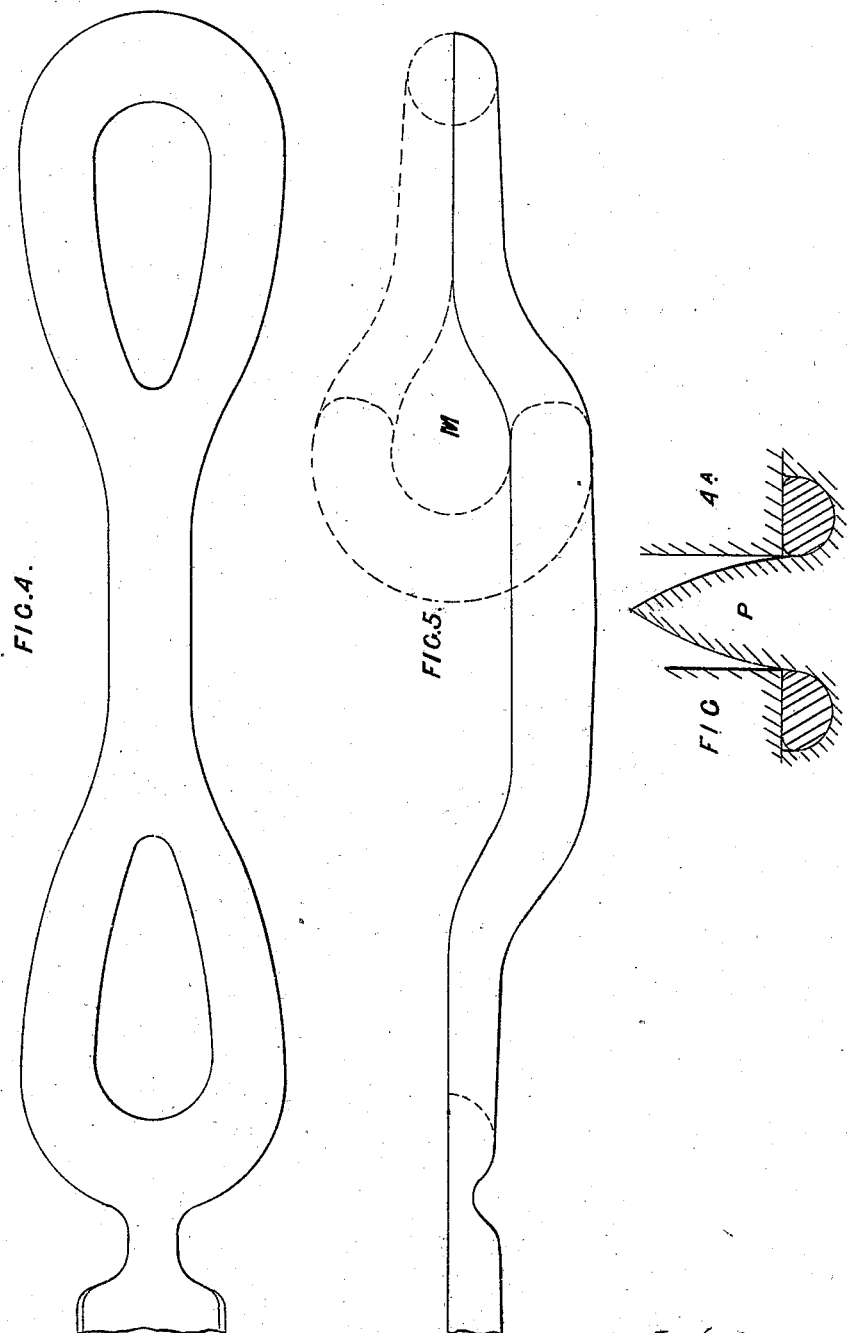

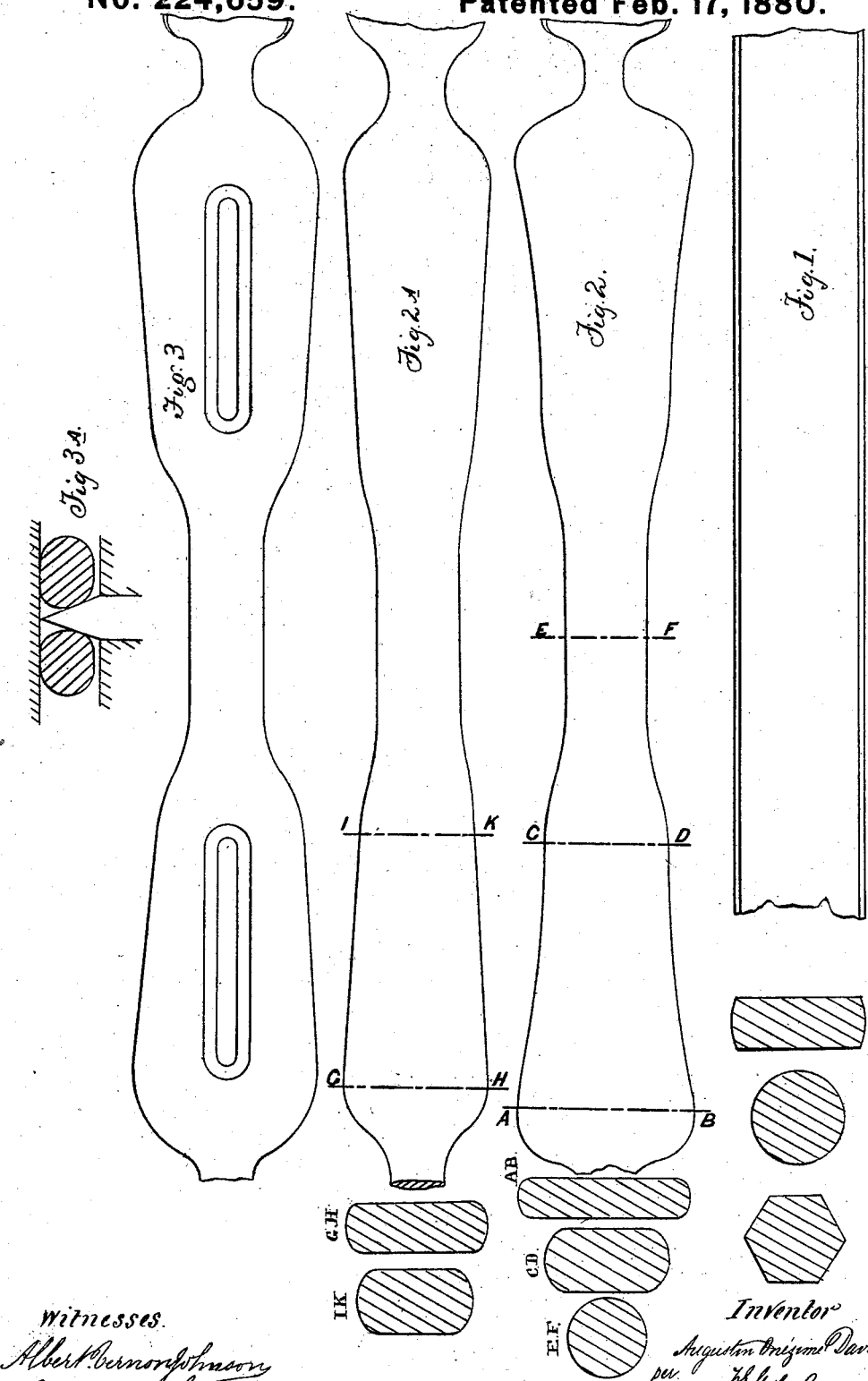

A. O. DAVID.
Manufacture of Weldless Chains.
No. 224,659. Patented Feb. 17, 1880.
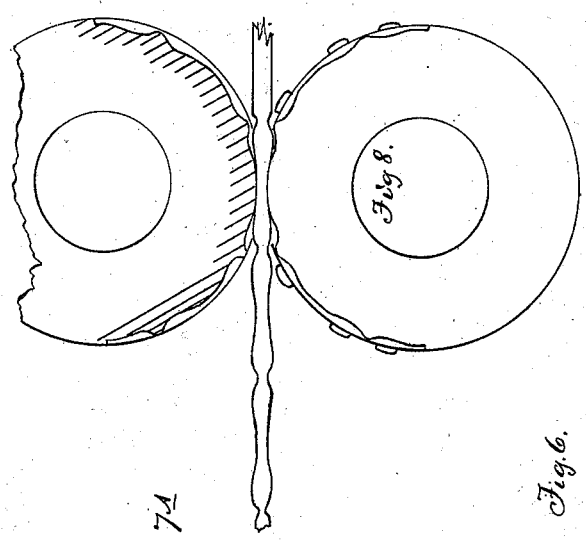
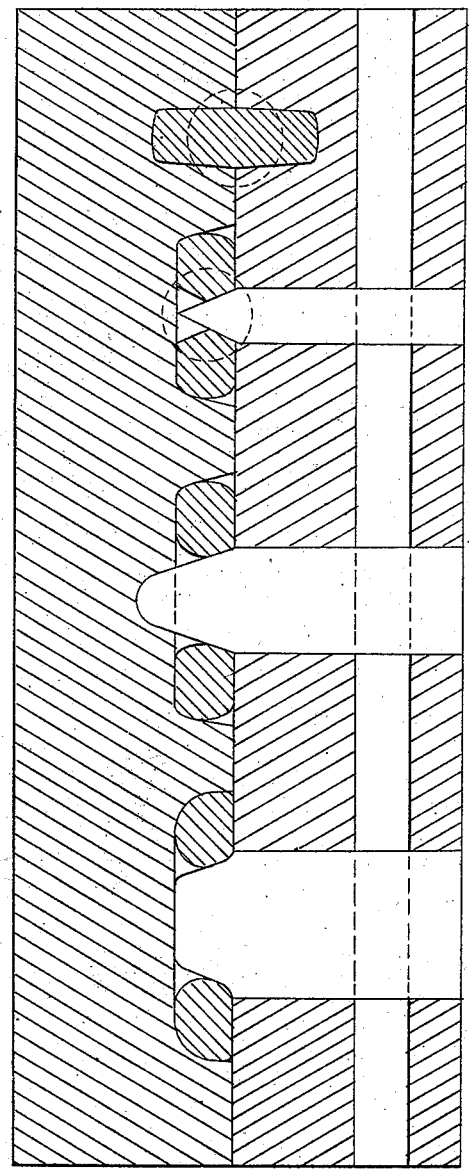
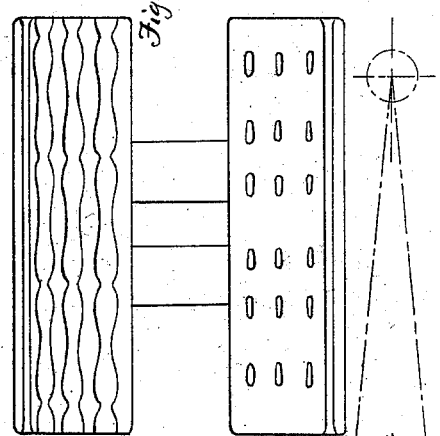
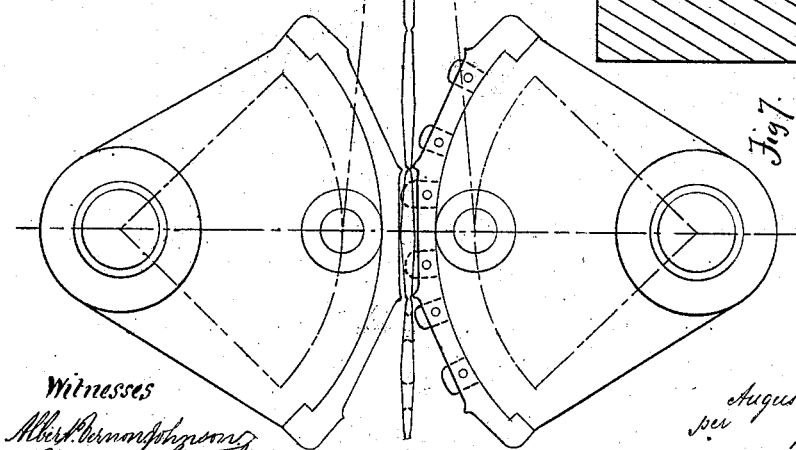
Witnesses
Inventor

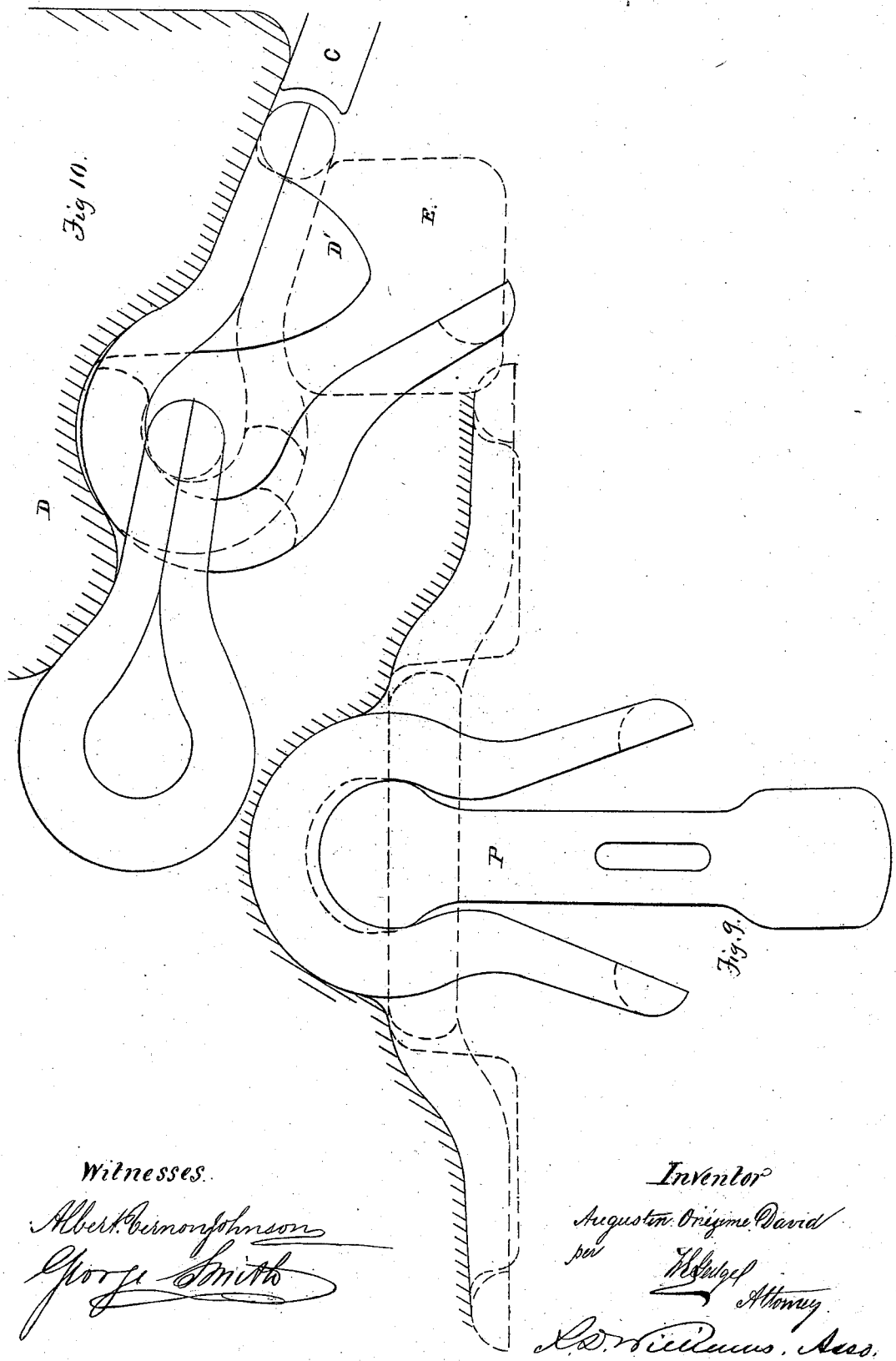

6 Sheets—Sheet 5.
A. O. DAVID.
Manufacture of Weldless Chains.
No. 224,659. Patented Feb. 17, 1880.
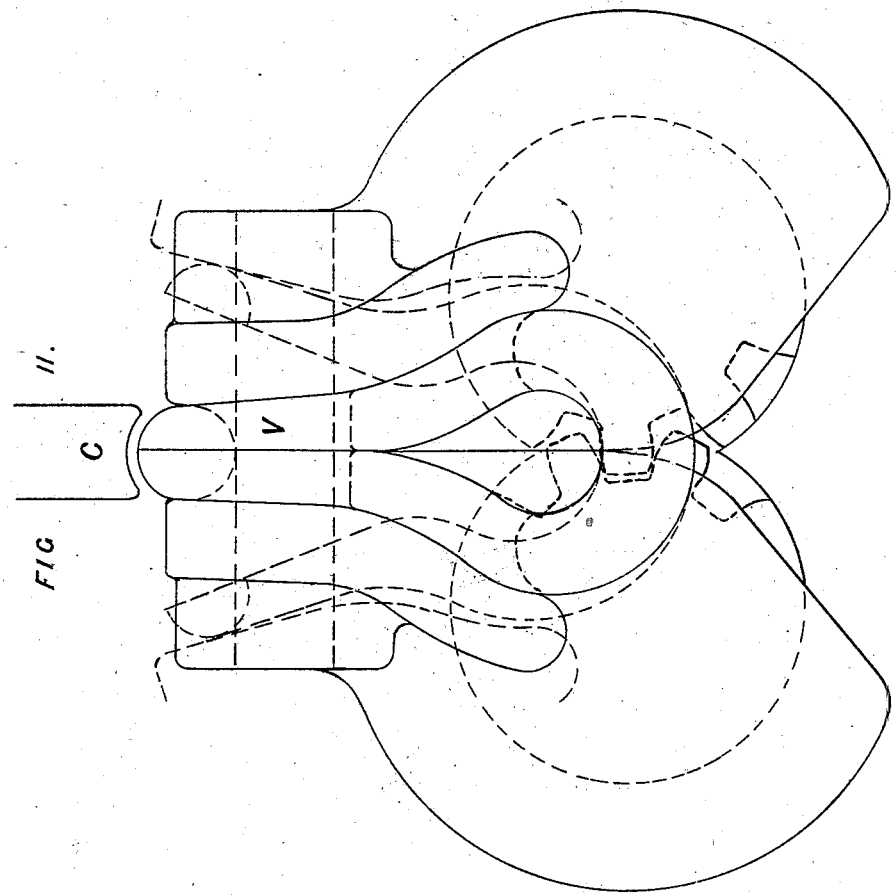
Witnesses
Albert Vernon Johnson
George Smith
Inventor
Augustin Onésime David
per
H. S. Gedge
R. D. Williams Attorney 6 Sheets—Sheet 6.
A. O. DAVID.
Manufacture of Weldless Chains.
No. 224,659. Patented Feb. 17, 1880.
FIG 14. 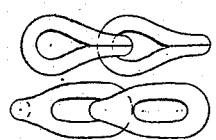  FIG 15. 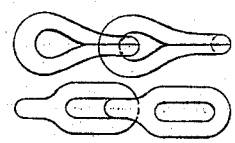  FIG 16. 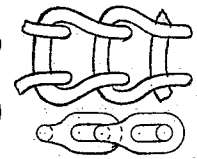
FIG 13. 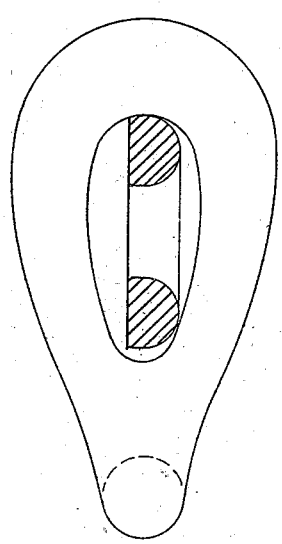  FIG 12. 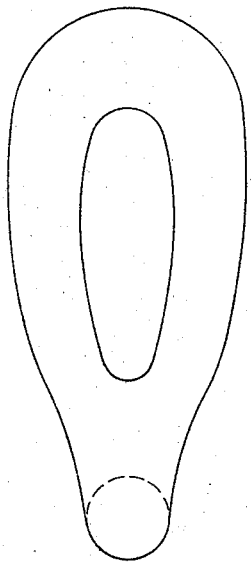  FIG 12ᴬ 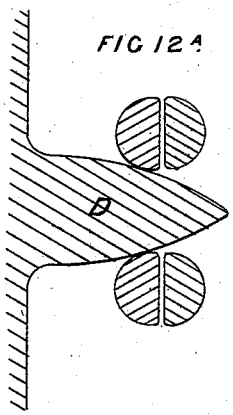
Witnesses.
Albert Vernon Johnson
George Smith
Inventor
Augustin Onisime David
per H. Hedge
Attorney.
R. D. Williams Ass.

UNITED STATES PATENT OFFICE.

AUGUSTIN O. DAVID, OF PARIS, FRANCE.

MANUFACTURE OF WELDLESS CHAINS.

SPECIFICATION forming part of Letters Patent No. 224,659, dated February 17, 1880.

Application filed November 29, 1878.

*To all whom it may concern:*

Be it known, that I, AUGUSTIN ONÉZIME DAVID, of Paris, in the Department of the Seine and Republic of France, have invented new and useful Improvements in the Manufacture and in the Construction of Steel or Iron Weldless Chains, of which the following is a specification.

The invention relates to a series of operations which, in combination, constitute a novel process of obtaining links for weldless chains.

To enable others to use my invention I will now proceed to describe my mode of manufacture, reference being had to the accompanying sheets of drawings and to the figures and and letters of reference marked thereon.

First. To manufacture a link I take a laminated straight bar having a rectangular, circular, or polygonal section, as shown, Figure 1, without previous preparation by stamping, punching, or casting the said bar, either by forging or by hydraulic press.

Second. I first rough-shape the said bar, either by hammering and dies, as shown, Fig. 2, or by rolling. (See Fig. 2ᴬ.) The object of this operation is to form the circular part of the link and to expand the metal toward the extremities, so as to prepare for the loops or eyes and avoid any waste.

Third. I then obtain a second rough shape of the link by means of dies, as seen in elevation, Fig. 3, in order to form the loops or eyes by the action of a conical-shaped punch which drives the metal asunder, Fig. 3ᴬ.

Fourth. I then finish the yet unfolded link on the same die, as shown, Fig. 4. By this operation the loops or eyes are gradually enlarged by the action of the conical punch P, Fig. 4ᴬ, and fill up the hollow part of the die, which has then the form of a finished but unbended and unfolded link.

Fifth. The link thus obtained (generally at one heat) is then brought onto a mold or hollow-shaped die, which gives to the loops or eyes of the link a regular curve, M, Fig. 5, by means of a hammer or of a hydraulic press. After this operation the link is cut off from the bar, another is then made by similar operations, and so on.

The various shapes of the links just described, and which are obtained by means of dies, steam-hammer or hydraulic press, may also, according to the destined use of the chain, be obtained more economically by a rolling-mill.

Fig. 6 represents the section of the bench of a rolling-mill and grooves producing the same shapes as the dies.

Fig. 7 is an end view of a pair of oscillating jaws, which by their action reduce the bar so as form the rough shape of the unbended and unfolded link, Fig. 7ᴬ being a plan of the same.

Fig. 8 illustrates the method for obtaining the above by means of continuous rollings, being an end view of a suitable pair of rolls.

The links having been cut off from the bar, each of them is separately stripped of its burrs or rough edges by means of an emery-wheel. Then the link is heated and bent on a die by means of a movable punch, P, Fig. 9. The driving back of the metal by striking the punch upon the inside part of the link prevents the metal from creasing by the contraction of the inside of the fold and from cracking by the expansion of the outside, thus producing a link of a perfect and regular shape.

The bent link is, at the same heat, linked and then shut. This operation is done either in a mold or on an anvil, D, provided with a punch, D', Fig. 10, or by the pressure of the jaws of a gripe-tongs, Fig. 11. The anvil D has the exterior form of the link and the punch its interior shape.

For the linking process on the anvil the eyes or loops of each link are brought toward each other and the link closed, either by an ordinary hammer or a steam-hammer acting on a movable die, E, Fig. 10.

The gripe-tongs, Fig. 11, when used for closing the links, are shaped exactly to the exterior curve of the links. Both the jaws have axles gearing one into the other by means of teeth placed on their circumference, and the closing of the link is brought about by the simple action of a lever on one of the axles, or by a fixed spur-wheel, or by an endless screw, the motion being produced by hand or mechanical contrivance.

To obtain symmetrical links and insure a smooth and free working in each other a set driving-hammer, C, Fig. 10, is used, and acts either by pressure or hammering, the loops then resting on the punch D', Fig. 10, or on the movable bolt, V, Fig. 11, of the gripe-tongs.

I will now describe the manufacture of a weldless chain, with reduction of the thread or interior longitudinal length of the link.

The system of weldless chains with loops requires a longer thread or opening of the loop or eye lengthwise than in ordinary chains, because the interior length of the loop must be equal to its exterior breadth in order to pass a link through the previously-made link. This long thread being a drawback in some of the applications of the weldless chains, I obviate this defect by making a long and narrow loop by forging with die or by rolling, as shown, Fig. 12. Then, after its linking to the chain, and while still hot, it is enlarged and consequently shortened in longitudinal interior length (see Fig. 13) by means of the conical punch D, Fig. 12<sup>A</sup>.

By this operation weldless chains with loops are obtained with an interior thread of about four times the diameter of the circular part instead of four and a half, which is the obligatory length before reduction.

By the several operations just described I obtain in a practical manner the various types of weldless chains shown: Fig. 14, round chains; Fig. 15, naval chains; Fig. 16, Vaucauson's or endless chains.

I am aware that it is not new, broadly, to construct a chain of weldless links, such having been hitherto formed by casting or forming each separate link from an ingot and then uniting them to form the chain. Such is not my invention, whose scope is indicated in the annexed claims.

I claim—

1. The process herein described of forming weldless chains, consisting in the following steps, viz: forming from a wrought-iron or rolled bar of uniform section link-blanks having a central cylindrical portion and flattened ends, punching the latter to form eyes, dilating and finishing the same, and finally curving and connecting the several links, substantially as set forth.

2. In the process of forming weldless chains, a dilation of the eye subsequent to connecting the links, substantially as described.

3. A weldless chain in which the eyes or loops are less in internal diameter than in external breadth, substantially as set forth.

AUGUSTIN ONÉZIME DAVID.

Witnesses:
 GEORGE HAWTHORNE SEIDMORE,
 DAVID THOMAS SCOTT FULLER.